United States Patent
Yanovsky

(10) Patent No.: US 7,739,409 B2
(45) Date of Patent: Jun. 15, 2010

(54) SYSTEM AND METHOD FOR MAKING AVAILABLE IDENTICAL RANDOM DATA TO SEPERATE AND REMOTE PARTIES

(75) Inventor: Eli Yanovsky, Haifa (IL)

(73) Assignee: King Green Ltd., Haifa (IL)

( * ) Notice: Subject to any disclaimer, the term of this patent is extended or adjusted under 35 U.S.C. 154(b) by 1054 days.

(21) Appl. No.: 09/791,686

(22) Filed: Feb. 26, 2001

(65) Prior Publication Data

US 2002/0120669 A1 Aug. 29, 2002

Related U.S. Application Data

(60) Provisional application No. 60/234,939, filed on Sep. 26, 2000.

(51) Int. Cl.
*G06F 15/16* (2006.01)
(52) U.S. Cl. ............... 709/248; 709/200; 709/205; 709/217
(58) Field of Classification Search ........... 709/201, 709/203–207, 208–248, 200; 380/44, 224, 380/252–276; 713/150–194
See application file for complete search history.

(56) References Cited

U.S. PATENT DOCUMENTS

| | | | |
|---|---|---|---|
| 3,866,217 A | | 2/1975 | Bennett, Jr. |
| 4,771,429 A | | 9/1988 | Davis et al. |
| 4,907,232 A | * | 3/1990 | Harper et al. ............... 714/3 |
| 5,003,598 A | * | 3/1991 | Kunstadt ............... 380/270 |
| 5,253,294 A | * | 10/1993 | Maurer ............... 380/264 |
| 5,627,894 A | | 5/1997 | Albert et al. |
| 5,703,948 A | * | 12/1997 | Yanovsky ............... 380/262 |
| 5,778,069 A | | 7/1998 | Thomlinson et al. |
| 6,266,413 B1 | * | 7/2001 | Shefi ............... 380/46 |
| 6,745,326 B1 | * | 6/2004 | Wary ............... 713/168 |

OTHER PUBLICATIONS

Jung et al. "Encryption With Statistical Self-Synchronization in Synchronous Broadband Networks", CHES'99, LNCS, 1717: 340-352, 1999.
Kolata "The Key Vanishes : Scientist Outlines Unbreakable Code", The New York Times on the Web, 2001.
Lyman "Unbreakable Code Said to Leave Hackers 'Helpless'", Newsfactor com, 2001.
Official Action Dated Jul. 13, 2007 From the US Patent Office Re.: U.S. Appl. No. 09/800,719.
Official Action Dated Dec. 8, 2006 From the US Patent Office Re.: U.S. Appl. No. 09/800,719.
Official Action Dated Mar. 8, 2006 From the US Patent Office Re.: U.S. Appl. No. 09/800,719.
Official Action Dated Aug. 10, 2004 From the US Patent Office Re.: U.S. Appl. No. 09/800,719.
Official Action Dated Oct. 15, 2008 From the US Patent Office Re.: U.S. Appl. No. 09/800,719.
Official Action Dated Apr. 21, 2008 From the US Patent Office Re.: U.S. Appl. No. 09/800,719.
Official Action Dated May 27, 2005 From the US Patent Office Re.: U.S. Appl. No. 09/800,719.

\* cited by examiner

*Primary Examiner*—Asad M Nawaz

(57) ABSTRACT

A system for rendering available a stream of identical random processes to at least two seperate and remote parties is disclosed. The system includes a multiple random process source which makes available a preferably large number of independent random processes. The system further includes a device available to the parties and which serves for selecting for use by each of the parties, at the same time, an identical one of said plurality of random processes.

21 Claims, 11 Drawing Sheets

Figure 12

| Area | BU in Memory | Master | | Slave | |
|---|---|---|---|---|---|
| | | Control Snt | BU Use | Control Rcv. | BU Use |
| Sure | Current | Curr | Current | N.M. | Current |
| Pre-1 | Current | Curr | Current | Curr | Current |
| | | | | Nxt | Next1 |
| Pre-2 | Current | Nxt | Next1 | Curr | Current |
| | | | | Nxt | Next1 |
| Post | Next | Nxt | Next | N.M. | Next |

SYSTEM AND METHOD FOR MAKING AVAILABLE IDENTICAL RANDOM DATA TO SEPERATE AND REMOTE PARTIES

REFERENCE TO RELATED APPLICATIONS

This application is a continuation-in-part of U.S. Provisional Application No. 60/234,939 filed Sep. 26, 2000.

FIELD OF THE INVENTION

The present invention relates to a system and method for making available random data to at least two separate and even remote parties.

BACKGROUND OF THE INVENTION

Randomness is used in many disciplines of science and technology and even economics, and finds application in fields such as communications, computing, data security, access control, experimentation and forecasting—e.g. weather forcasting—and like processes and in simulations, particularly of processes involving chaos theory.

In some systems, there is a need for identical and simultaneous randomness at different remote locations. Furthermore, random data employed at the remote locations is preferably confidential and unknown to an unauthorised party. Examples include
(i) secret key data encryption methods, in which both communicating parties need to have the same secret key, which is typically a random key;
(ii) remote access control in which a distant operator needs to have the same password as that installed in a 'machine' to be accessed—this passsword is preferably a random passsword;
(iii) weather forecasting,
(iv) remote computing applications requiring identical random parameters,
(v) chaos processes which are executed remotely,
(vi) frequency hopping systems, and
(vii) data hiding or steganography.

Encryption, for example, is one of a series of useful tools that allow secure electronic communications, wherein data of highly sensitive content is propagated through public networks. Ideal secure electronic communication should comprise the following three features:

1) protection of data from unauthorized tampering,
2) identification and authentication of the data source, and
3) prevention of unauthorized access to the data.

Keys or key systems for encrypted data as described above often rely on random processes for their creation. Authorized parties to a given communication need compatible keys. However it is preferable to avoid sending keys, both in order to avoid interception, and also to make the encryption process simpler and faster. Preferably, therefore, authorised parties to a communication should be able to produce the same random key independently. Unfortunately, however, the definition of randomness does not permit replication, which is to say no process that can be repeated may be truly random. Current approaches for dealing with this issue are addressed by two general families of solutions:

(i) generating randomness at one party, and sending the outcome—for example random data forming key(s)—to the other party; and
(ii) using a pseodo random process at both parties, e.g., a PRNG (Pseudo Random Number Generator) which gives the same (apparently random) bit stream as an output at both parties if fed by the same input seed.

These approaches are limited because they both involve sending data from one party to the other, and the data, whether the random data itself in the first instance or the seed in the second instance, may be intercepted by an unauthorized party.

The problem thus remains of having identical randomness at separate and even remote parties. One possibility, involves separately and independently to safely supply each party with an identical list of random numbers. Another approach is to supply each party with the same semi-random or pseudo-random algorithm and somehow synchronize their starting points. Synchronization may typically be by means of a clock or by a signal sent to the two parties or from one of the parties to the other.

Clock synchronization is problematic in that there will always be a time difference, however small, between the two parties. Signal synchronization is subject to the so-called "Byzantine agreement problem" which may be stated as follows:

Two separate and remote allied armies, A and B, approach to besiege a powerful city. Neither army alone is powerful enough to overcome the city and should it appear on the battlefield alone it will be destroyed. Only if both armies appear simultaneously and from opposite directions, is there any chance of success.

The overall commander, located with army A, has to co-ordinate an attack, but has at his disposal dispatch riders as his only means of communication.

The overall commander thus sends a message to the commander of Army B, by dispatch rider, which conveys the time and directions of the intended simultaneous attack. However, having sent the message by a courier, the sender—the commander of army A—cannot be certain that the message has reached its destination, (and if it has, that it has not been tampered with on the way). Thus logic dictates that he will not attack, due to his instinct for self-preservation.

Having received the message, the commander of Army B is faced with the same problem, he cannot be certain that the content of the message is real and that it indeed comes from his ally. It could be a false message sent by the enemy and intended to lure him to his destruction. Furthermore, and most importantly, he knows that commander A has an instinct for self-preservation which is no less real than his own and he knows for sure that the logic of commander A tells him not to attack. Thus he must assume that A will not attack and hence he too, does not attack.

For solving the agreement issue one may suggest that commander B can send back to army A an acknowledgment message, acknowledging the receipt of the first message (of the time and direction of the attack). Nonetheless, the two allies remain with the same dilemma, and commander B, who has sent the acknowledgment message cannot be sure it has reached army A untouched—thus B's instinct for self-preservation leads him not to attack. Furthermore, the commander of army A, will be faced with the same dilemma when receiving his acknowledgement and is unlikely to launch an attack on the basis of this information. Army A receives the acknowledgement but also cannot be sure that the acknowledgement is genuine and has not been sent by the enemy to lure him to his destruction. Furthermore, A knows of B's instinct for self-preservation. Bearing this in mind, army A must assume that army B will not attack. The situation is not improved however many further rounds of acknowledgement or confirmation are carried out. That is to say, having sent the acknowledgment message, both army A and army B keep facing the same dilema of not being able to assume that the other will attack and, as a result, an attack will never be launched.

The "Byzantine Agreement Problem", is a logical dilemma that is relevant when translated into modem communications, especially when considering for example, open communication modes such as the Internet, which are exposed to hackers, imposters etc. and to errors, cuts and breaks in communications.

The issues that this logical dilemma presents, and which must be solved are (i) synchronization; (ii) simultaneity; (iii) identification; and (iiii) authentication.

At the basis of the problem lies the fact that at any given step, one party knows less than the other, and there is a lag between the knowledge of the parties (about the situation of one party in regard to the other party, and in their mutual understanding).

There is thus a widely recognized need for, and it would be highly advantageous to have, a simple way to produce identical ongoing randomness at seperate and remote locations, that is confidential by nature and which enables a mode of communication, synchronization or authentication between two parties that is not vulnerable to the logical dilemmas of the Byzantine agreement problem.

A limited solution and for the limited application of encryption, is to be found in U.S. Pat. No. 5,703,948 which uses state machines to produce pseudo-random keys for the encryption of messages between parties.

SUMMARY OF THE INVENTION

Embodiments of the present invention may provide a system and method for enabling authorized users to access an output of a single random process from a plurality of random processes, and then continously randomly and synchronously to select a different accessed random process from the plurality of random processes.

According to one aspect of the present invention there is provided a system for rendering available a stream of identical random processes to at least two seperate and remote parties, and a first device available to the parties for selecting for use by each of the parties, at the same time, one identical random process from the plurality of random processes.

According to another aspect of the present invention there is provided a system for electronically communicating data, comprising a first device available to the parties for selecting for use by each of the parties, at the same time, one of the plurality of random processes for use in a current step of communication.

According to yet another aspect of the present invention there is provided a system for creating identical synchronized randomness in at least two seperate and remote locations using an output of one random process from a plurality of random processes, the system comprising a first device for selecting the random process, which selection consecutively changes at various time intervals.

According to further features in preferred embodiments of the invention described below, the first device is operable to consecutively change the selected random process in a random manner.

According to still further features in the described preferred embodiments the first device is operable to select pseudorandomly from the random processes. In general, any function that takes a random input and produces an output that in combination with the input is unpredictable, is suitable as a pseudorandom function. In the following description and claims such a function is occasionally referred to as a pseudorandom generator and occasionally simply as a function.

According to still further features in the described preferred embodiments the first device is operable to select randomly from the random processes.

According to still further features in the described preferred embodiments the first device is operable to provide a random output for selecting one of the plurality of random processes for a next use by the parties.

According to still further features in the described preferred embodiments the first device is a software device.

According to still further features in the described preferred embodiments the parties are connected via a network and wherein the system is located on a host connected to the network.

According to still further features in the described preferred embodiments the random output for the next selection is an output of the selected random process currently used by the parties.

According to still further features in the described preferred embodiments the system further comprising a second device being for continuously communicating controlled messages between the parties, the controlled messages providing an indication of mutual synchronization of a current step of selection between the parties.

According to still further features in the described preferred embodiments the system further comprising a third device for keeping in memory a selection for resynchronization.

According to still further features in the described preferred embodiments the controlled messages contain an error correction code designed to keep the mutual synchronization.

According to still further features in the described preferred embodiments the parties are connected via a network, the system is located on a host connected to the network and the second device is connected to the network.

According to still further features in the described preferred embodiments the first device and the second device are a single device.

According to still further features in the described preferred embodiments the third device is operable to select one of a plurality of random processes for resynchronization.

According to still further features in the described preferred embodiments the third device is operable to consecutively change the selected resynchronization random process in a random manner.

According to still further features in the described preferred embodiments the third device is operable to change the resynchronization selection pseudorandomly.

According to still further features in the described preferred embodiments the third device is operable to change the resynchronization selection randomly.

According to still further features in the described preferred embodiments the third device is operable to provide a random output for selecting one of the plurality of random processes to be kept in memory.

According to still further features in the described preferred embodiments a memorized selection provides a backup to be used in a next step by the parties, in case of de-synchronization.

According to still further features in the described preferred embodiments the first device and the third device are a single device.

According to still further features in the described preferred embodiments the second device and the third device are a single device.

According to still further features in the described preferred embodiments the first device, the second device and the third device are a single device.

According to still further features in the described preferred embodiments the third device is also connected to the network.

According to still another aspect of the present invention there is provided a system for maintaining synchronization between at least two parties which parties are using one of a plurality of separately random processes in a current use, the system comprising a device for continuously communicating controlled massages between the parties, the messages providing an indication of mutual synchronization between the parties.

According to still further features in the described preferred embodiments the messages contain an error correction code designed to keep the mutual synchronization.

According to an additional aspect of the present invention there is provided a system for maintaining synchronization between at least two parties which parties are using one of a plurality of separately random processes in a current use, the system comprising a device for selecting one of a plurality of separately random outputs to provide a backup selection in the case of desynchronization between the parties.

According to further features in preferred embodiments of the invention described below, the device is operable to consecutively change the backup selection in a random manner.

According to still further features in the described preferred embodiments the device is operable to consecutively change the backup selection pseudorandomly.

According to still further features in the described preferred embodiments the device is operable to change the backup selection randomly.

According to still further features in the described preferred embodiments the device is operable to provide a random output for storage in memory to provide a backup selection.

According to still further features in the described preferred embodiments the steps of the process are grouped into stages and groups of stages, wherein the device is operable to exchange the backup selection after a group of stages and wherein the device is operable to control the parties to remain within a maximum distance of one stage from each other.

According to still further features in the described preferred embodiments the stages are defined into stages close to a backup selection changeover point and stages remote from a backup selection changeover point, and wherein a choice of using either one of a current backup selection or a following backup selection (that is after a changeover) is dependent on whether a current stage is one of the close stages or one of the remote stages.

According to yet an additional aspect of the present invention there is provided a method for enabling the use of identical random process selections at the same time, to at least two seperate and remote parties and maintaining synchronization between the parties, the method comprising the steps of (a) maintaining a plurality of separately random processes; (b) selecting one of the plurality of random processes; and (c) consecutively changing the selection in a random manner.

According to further features in preferred embodiments of the invention described below, the method further comprises the step of (d) continuously communicating controlled messages between the parties, the messages providing an indication of the mutual synchronization between the parties; and (e) communicating error correction code between the parties, thus maintaining the synchronization.

According to still further features in the described preferred embodiments the method further comprises the step of (d) selecting one of the plurality of random processes; (e) keeping the selection in memory, thus maintaining the selection as a backup selection; and (f) using the backup selection, in case of de-synchronization.

According to still further features in the described preferred embodiments the method further comprises the steps of (g) grouping steps of the communication into stages and groups of stages; (h) exchanging the backup selection after a group of stages; and (i) controlling the parties to remain close to each other within a maximum distance of one stage from each other.

According to still further features in the described preferred embodiments the method further comprising the steps of (j) defining the stages into stages close to a backup selection changeover point and stages remote from a backup selection changeover point; and (k) using either one of a current and a next (that is after a changeover)backup selection, depending upon whether a current stage is one of the close stages or one of the remote stages.

The present invention successfully addresses the shortcomings of the presently known configurations by providing a system and method for s providing a plurality of parties at remote locations with confidential and identical random outputs of a random process and maintaining synchronization with respect to a currently used random process in a manner so far unpresidented.

Implementation of the method of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 12 is a simplified table summarizing the process of resynchronization of FIG. 8.

DESCRIPTION OF THE PREFERRED EMBODIMENTS

Figure 1:
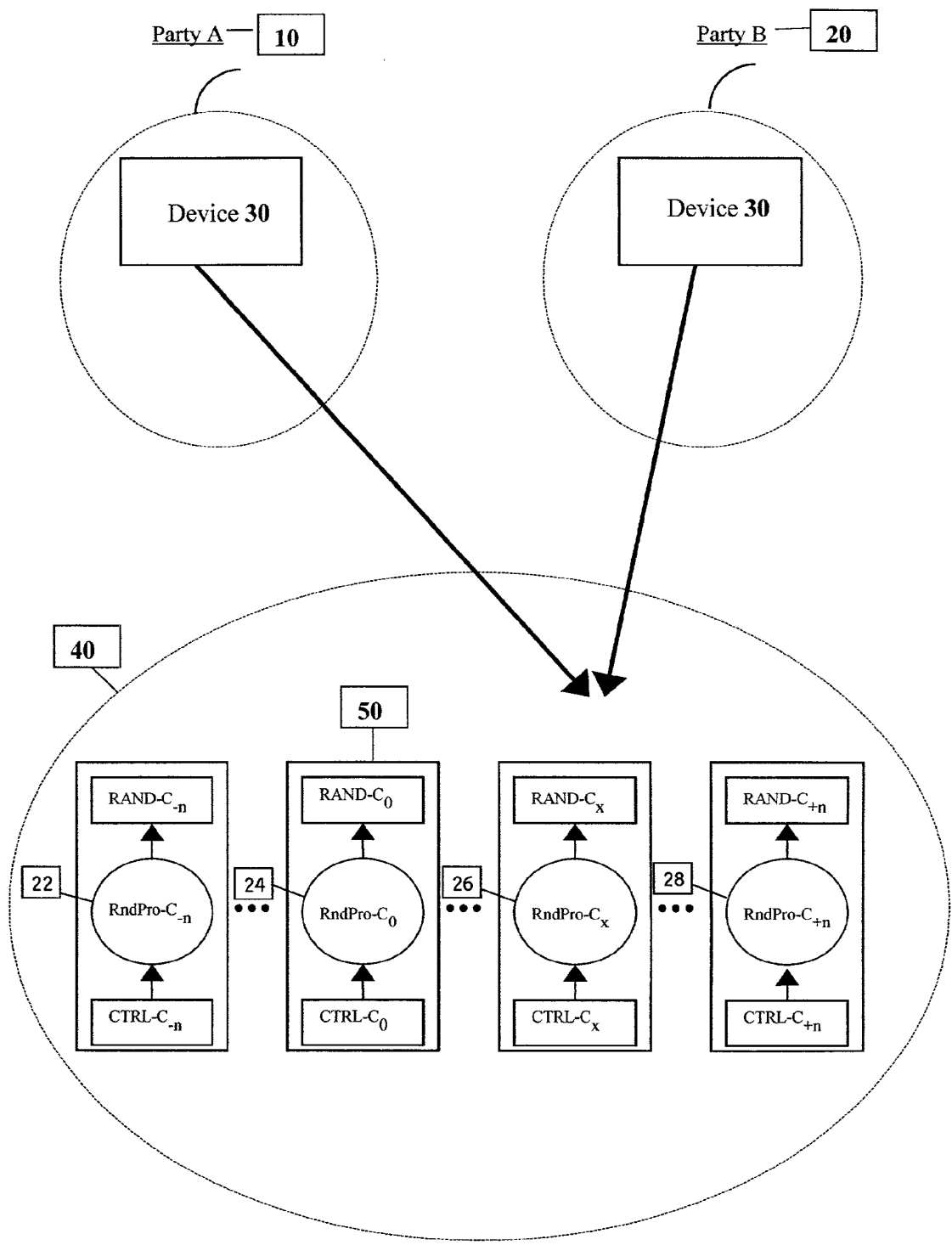
FIG. 1 is a simplified diagram illustrating a system, operative in accordance with a first preferred embodiment of the present invention, for supplying at least two authorized parties with identical random data over an open network, whilst at the same time keeping the random data confidential from a third party.

The present embodiments relate to a system and method for providing at least two authorized parties with simultaneous access to an identical random process, and specifically to the random outputs of the process. A plurality of random processes are provided, each being independently accessible and the parties each have a selector device that enables them to select one of the plurality of random processes, and then to use the output of the selected random process as the random data, for own needs. The selection of one of the plurality of random processes is regularly changed by the device in a random manner identically and simultaneously at the two users so that the users are always taking their random outputs from the same random process at any given time. Third parties do not have the current internal data of the selector device and are thus not able to determine which of the large number of random processes is being selected. No keys or seeds need be transferred between the parties. Furthermore, features are included for keeping the parties substantially synchronized at all times. The plurality of the random processes may be made available over an open network and this plurality should preferably have a sufficient number of random processes to foil any attempt at brute force breaking of the system (=of the current selection).

Before explaining the preferred embodiments of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Referring now to the drawings, FIG. 1 illustrates a system according to a first embodiment of the present invention which is designed and constructed for supplying at least two authorized parties, 10 and 20, with identical random processes, whilst excluding any unauthorized party. To this end, the system includes a plurality of independent random processes, which can be regarded as a field of multiple random processes 40. Each of the multiple random processes from the field 40 can be independently selectable. Each party, 10 and 20, preferably has a selector 30 for randomly selecting one of the random processes from the field 40. The output of each random process is preferably a continuous stream of random data. As will be explained in detail below, the two selectors 30 select the same process, thus rendering a single one of the plurality random processes 40 available, at the same time, to both parties 10 and 20. By contrast, an unauthorized outsider, who does not have a selector 30 that is updated with the same current internal data as the two parties have, sees only a large number of random processes and outputs.

Preferably the number of random processes available in the field 40, is large enough to render computationally unfeasible any brute force methods of determining the one selected random process.

Each of the plurality of random processes used in the present embodiment can be any natural and/or physical real random process as exemplified by, but not limited to, radioactive decay, white noise of a diode, serial tossing of a fair coin or dice, noise of rain on a tin roof, sun spots sparkles, and the like, or make use of pseudo random processes.

Pseudo random processes generally involve a Pseudo Random Number Generator (PRNG). A PRNG is usually a computer program, which is preferably given an input of a seed that preferably is in itself truly random, that is preferably the output of a natural and/or physical random process.

In FIG. 1 the plurality of the random processes of field 40, are symbolized by 4 random processes 22, 24, 26 and 28, which are differentiated from each other by their indexes (−n for the leftmost process, 0 for the origin, x for the presently selected process and +n for the rightmost one), thus 'RndPro-$C_x$' for example for x, and schematically each random process is controlled by a control box, thus 'CTRL-$C_x$' for example for x, and the output random data is gathered into a register such that the parties may copy therefrom the random data, thus 'RAND-$C_x$' for example for x. These registers are likewise differentiated from each other by their indices.

The system and its operation are further described hereinbelow with respect to FIGS. 2-5. FIGS. 6-12, which follow, concern further embodiments which provide a preferred mode of solving cases of the parties losing synchronization.

In the present embodiment, each party 10, 20, preferably gains access to the same one of a plurality of random processes operating at a location, including a remote location, but such that the parties (and even an unauthorized party) can have access to any of the random processes and their outputs. As will be explained in detail below, the random data of the random process currently being accessed determines a next random process to be selected and accessed. Thus, accurate receipt of the random output is necessary in order to maintain synchronization between the parties, so that they can make an identical next selection.

Figure 2:
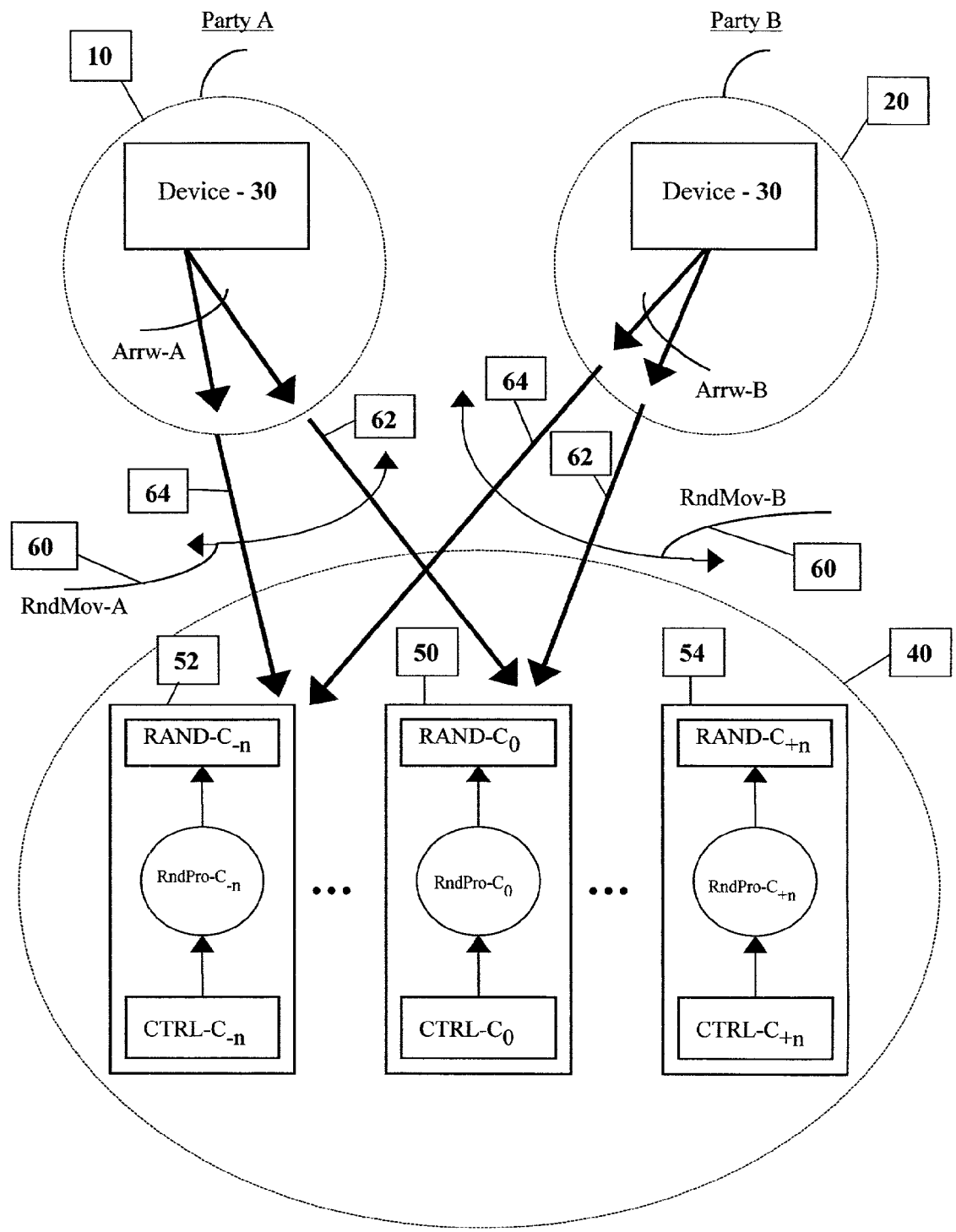
FIG. 2 is a simplified diagram schematically illustrating consecutive selection by the parties of a new random data source or process in the of FIG. 1.

Reference is now made to FIG. 2, which is a simplified diagram schematically illustrating two users moving simultaneously and randomly between different random processes in the system of FIG. 1. Parts that are identical to those shown above are given the same reference numerals and are not referred to again except as necessary for an understanding of the present embodiment.

In FIG. 2, a series of random processes 50, 52 and 54 form a field of multiple random processes 40. At a current stage, users 10 and 20 both use the field 40, and both select random process 50 as indicated by arrows 62. For the following stage, a simultaneous random move of the selectors 30, at each one of respective users 10 and 20 (indicated by arrows 60) transfer the two users to select random process 52. The selection of random process 52 at the next stage is indicated by arrows 64.

Preferably, selector 30 uses at least some of the output of random process 50 of the current stage, as an input to a selection process that takes place identically at each of the two selectors 30. The output of this selection process at each of the selectors 30 defines the random move or hop 60. Hereinafter, the random move 60 is referred to as a hop, since the users hop between one random process and another, and the location index of the output of the respective selection process is referred to as the hop address. It will be appreciated that the definition may be in terms of an absolute address, or it may be in terms of a relative address, that is to say it may define the move rather than the actual address.

The random move or hop occur simultaneously at both parties and in a sequential manner, such that after selecting random process 50 at current stage, the next selection of the selectors 30 of both parties is a new selection, and as an example here, of random process 52.

Figure 3:
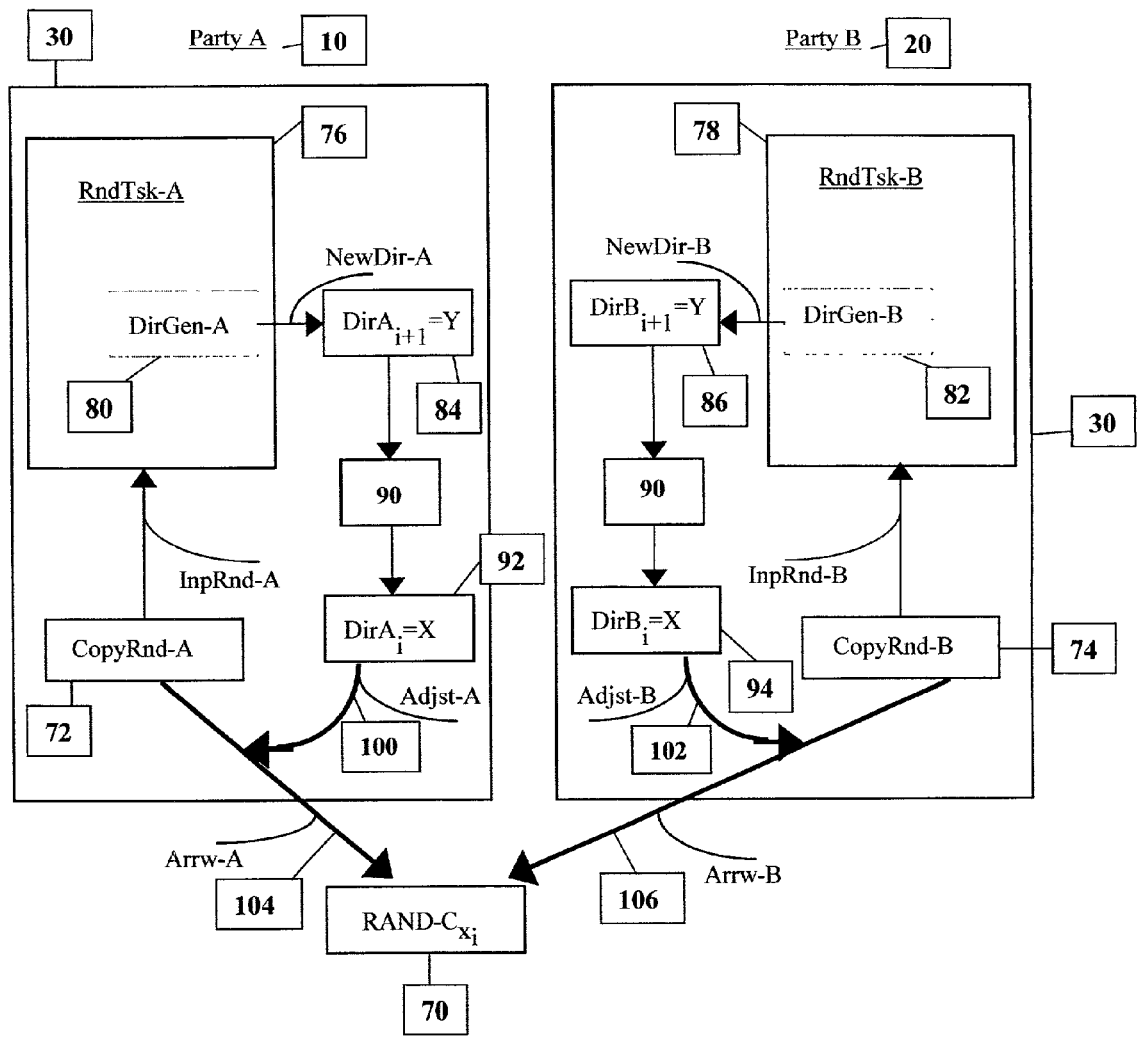
FIG. 3 is a simplified block diagram illustrating internal details of a selector device of FIG. 1 and 2, for use in changing between different random process selections.

Reference is now made to FIG. 3, which is a simplified block diagram illustrating internal details of selectors 30 whilst hopping between different random processes.

Each selector 30 preferably comprises a selection process 80, 82. The selection process 80, 82 is connected to a next hop register 84, 86, which receives output from the selection process to define the next hop. The output of the currently accesses remote random process is passed to random number register, 72, 74, which in turn is fed to the selection process 80, 82 thereby to produce an output which may be used to define a next hop address.

As a result of receiving the output of the currently selected random process, as an input to the the selection process, the selection process generates an output which is used as described above in order to provide the next hop. Since the input is random, and is identical at both parties, an identical random selection of a next hop is expected at both parties. Additionally to providing a random input for the selecting process the output of the random process may be used to carry out any other task requiring random data, indicated in the figures by process units 76 and 78.

A current hop register 92, 94 preferably contains the address of the presently selected one of the remote random processes, that is to say the current hop address, indicated as 'x' in address unit 70, and which adjusts the selection arrow 104, 106 by 'adjustment tools' 100, 102. In order to change the address, a newly formed address, indicated as 'y', formed as described above, passes from the next hop register 84, 86, via a delay gate 90, to the current hop register 92, 94.

Figure 4:
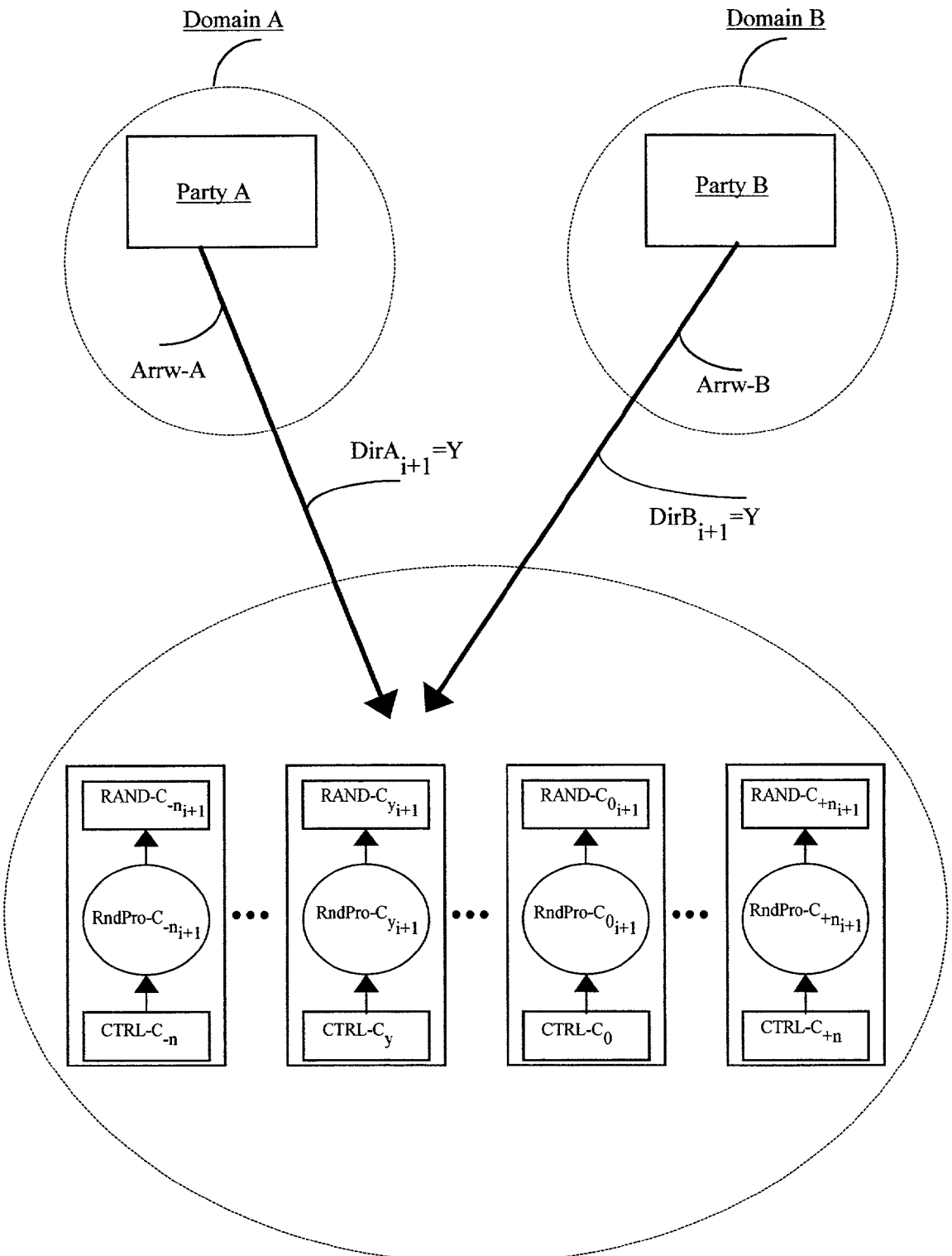
FIG. 4 is a simplified schematic diagram illustrating the embodiment of FIG. 1 following the change in random process selection shown in FIG. 3.

Reference is now made to FIG. 4, which is a simplified schematic diagram showing the embodiment of FIG. 1 one stage further advanced. Parts that are identical to those shown above are given the same reference numerals and are not referred to again except as necessary for an understanding of the present embodiment. In the embodiment of FIG. 4 the remote random process that is being accessed by the two selectors 30 has now been changed, and is now random process 'y', at stage i+1, preferably as a result of the process described above in respect of FIGS. 2 and 3.

Figure 5:
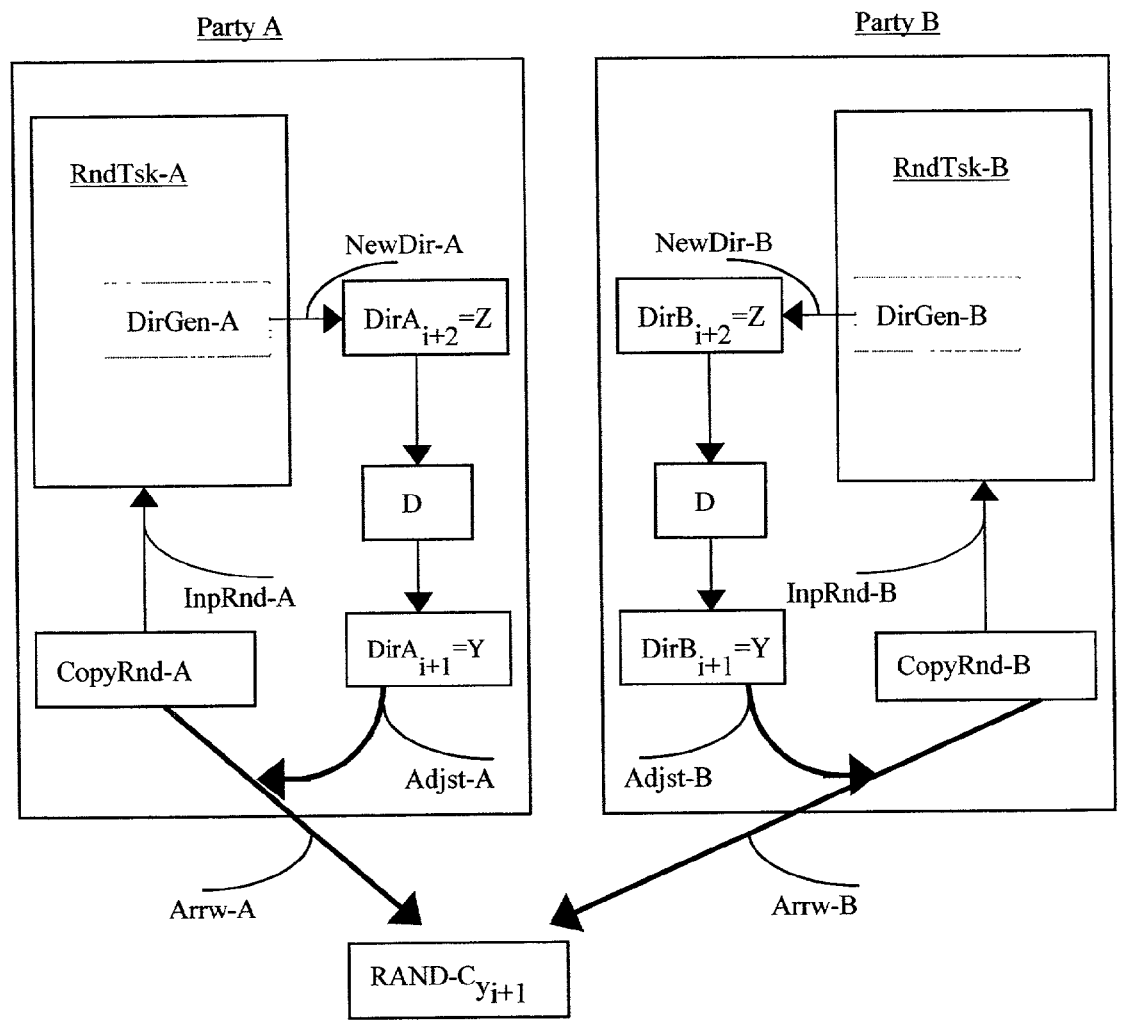
FIG. 5 is a simplified block diagram illustrating the apparatus of FIG. 3 carrying out a consecutive change in random process selection

Reference is now made to FIG. 5, which is a simplified block diagram of the embodiment shown in FIG. 3, but another step further on in the process, and parts that are identical to those shown above are given the same reference numerals and are not referred to again except as necessary for an understanding of the present embodiment. FIG. 5 differs from FIG. 3 in that it illustrates the selector after the next random process has been selected. That is to say the next hop address of FIG. 3 is now the current hop address and a new next hop address is generated as described above denoted 'z', and is stored in the next hop register 84, 86.

According to the above-described embodiments there is thus provided a means for confidentially sharing random data over an open network between two or more remote parties, for any purpose and use the parties may wish.

The above-described embodiment, however, depends on the two parties being synchronized, and it is possible for synchronization to be lost. Channels are noisy and are liable to distort signals, and incorrectly interpreted random data can lead to incorrect selection of the next hop address.

The embodiments described hereinbelow are designed to keep the authorized parties in synchronization and to deal with problems in this regard as they arise, bearing in mind the logical dilemmas of the Byzantine agreement problem mentioned above, without compromising the confidentiality of the process.

Figure 6:
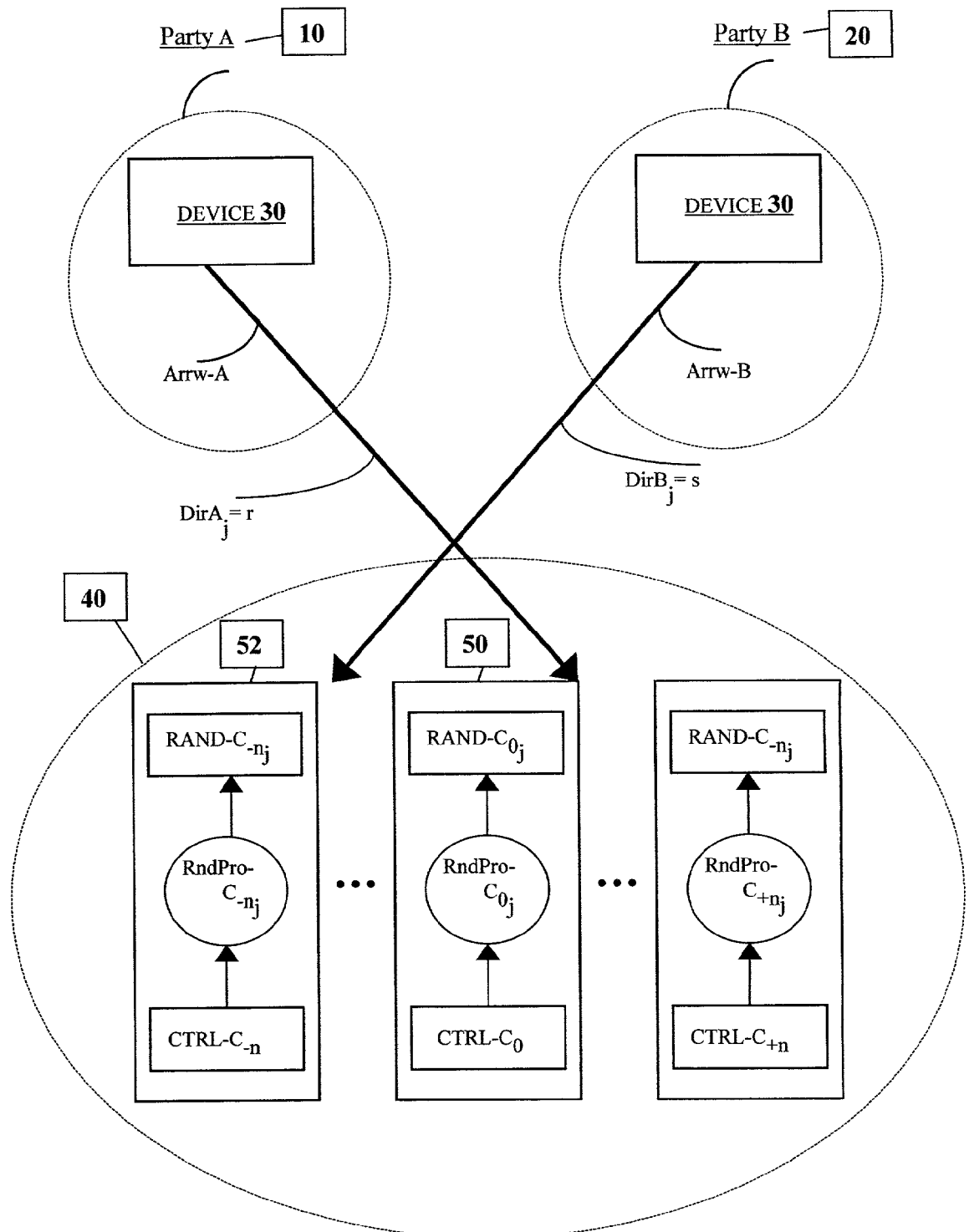
FIG. 6 is a simplified schematic diagram illustrating a situation in which there has been loss of synchronization between the parties.

Reference is now made to FIG. 6, which is a simplified schematic diagram similar in format to that of FIG. 1 and which illustrates the consequences of loss of synchronization. Parts that are identical to those shown above are given the same reference numerals and are not referred to again except as necessary for an understanding of the present embodiment.

As discussed above, the current gathered random data that is used for producing the next hop address is gathered from the output of the current hop address. It follows that any mistake in reading the random output of the current hop address can lead to selection of an incorrect next hop address and in such an event the parties lose synchronization.

In a preferred embodiment of the present invention, resynchronization may be achieved by the following resynchronization procedure. The procedure preferably comprises three distinct stages as follows:

a first stage of recognition that synchronization has been lost, a second stage of prevention of occurance of synchronization loss in minor cases that are easily correctable and a third stage of resynchronization of the two parties in the event of a case of gross error leading to actual synchronization loss.

It is the third of the above stages which is the most complex and which will be discussed in detail.

The recognition of an occurrence of de-synchronization is preferably achieved by communicating back and forth between the parties in such a way as to indicate the mutual accuracy of the random numbers received, whilst at the same time not revealing those numbers to any unauthorized party.

Preferably, control messages are sent between the parties (such messages can be in the open and any unauthorized party may have and see them) containing indicator bits associated with the current random output that can be compared with self-produced such bits from the random data that the party receiving the control message is able to produce. If the comparison is successful then it may be assumed that the parties are synchronized, but otherwise it must be assumed that they are not. The control messages may contain information concerning the random data received from the random process now selected, but are preferably arranged such that the information is too sparse for an unauthorized party to calculate the correct random data and thereby either identify the correct hopping address or otherwise reconstruct the random data. Thus, confidentiality may be sustained.

The information in the control message may be any one or a combination of:

1) bits of an error detection code of the random data, e.g. a parity checks of the random data, 2) a result of a one way function of the random data such as a hash function, or CRC, etc.

Preventing of synchronization loss in minor cases, that is, cases of a minor errors is preferably achieved using an error correction code messaged between the parties. A number of methods are well known to the skilled person. Typically, corrections for minor errors may be carried out continuously in the background and may not even require synchronization loss to be detected as such. That is to say a correction technique may comprise its own check and automatic correction of the random data.

Error correction codes necessarily have limits regarding the maximum number of incorrect bits that they can correct. Thus, such protection is never fully able to protect from synchronization loss and such synchronization loss is liable to occur whenever a given bit error rate is exceeded. Another cause of synchronization loss are cases of cuts in the communication.

All the stages (detecting, preventing and resynchronization, to be explained in detail in the following) of handling synchronization loss are preferably handled by synchronizer 32.

Figure 7:
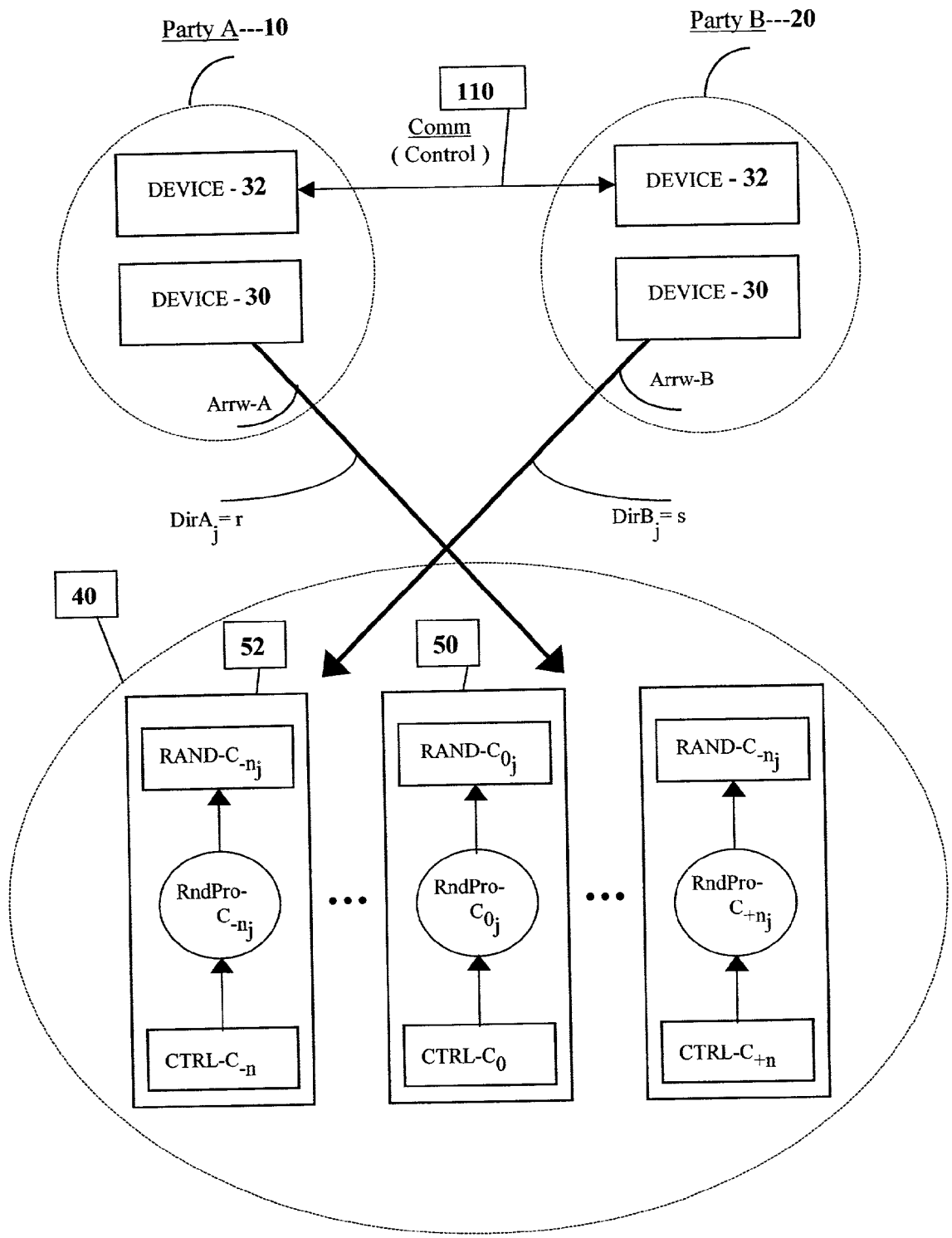
FIG. 7 is a simplified schematic diagram illustrating an embodiment that is able to identify and overcome the loss of synchronization shown in FIG. 6.

Reference is now made to FIG. 7, which is a further preferred embodiment of the present invention. Parts that are identical to those shown above are given the same reference numerals and are not referred to again except as necessary for an understanding of the present embodiment. The embodiment of FIG. 7 additionally comprises the above-mentioned synchronizer 32, and a communication channel 110 for communicating control messages between the parties. The detection and the prevention stages of synchronization loss are not detailed herein as they are within the ability of the skilled man. The third one of the above mentioned stages of resynchronization of the two parties, namely what happens in the event of actual synchronization loss occurs is described hereinbelow. In such a case, each party has a backup synchronizer, here indicated by synchronizer 32 which has been referred to above.

The backup synchronizer 32 preferably stores some of the random data received earlier, from which a new random process selection can be generated when necessary. As will be explained in more detail below, cases of actual synchronization loss occurs relatively infrequently. Thus the data stored in the backup synchronizer need change only at a relatively low rate in order to maintain confidentiality, generally at a rate which is one or more orders of magnitude lower than that at which the regular hop address is changed. The precise relationship between the two rates may typically depend upon noise and distortion levels in the actual channel.

At any given time in the procedure, if synchronization is actually lost, the parties 10 and 20 revert to a new hop address derived from data contained in the backup synchronizer 32, as will be explained in more detail below. As described above, the parties 10 and 20 determine from the control messages that they are not looking at the same random process and are not copying the same random data, which is to say that synchronization has been lost, and they then simultaneously take remedial action and revert to a backup hop address based upon data that has already been stored before synchronization was lost. As will be explained further below, although the backup hop address is based on data already stored, the data is preferably used in conjunction with a generation process different from that used for generating the regular hop address. Thus the generated and selected backup hop address will not necessarily be a previously used regular address. Furthermore, the data is preferably data that has already been used for generating and selecting a regular hop address prior to synchronization loss. Since the two parties successfully remained in synchronization at that previous regular hop address stage there is a strong probability that the other party has identical resynchronization data and that resynchronization will thus be successful. In other words, resynchronization is preferably carried out using previously verified random data.

Figure 8:
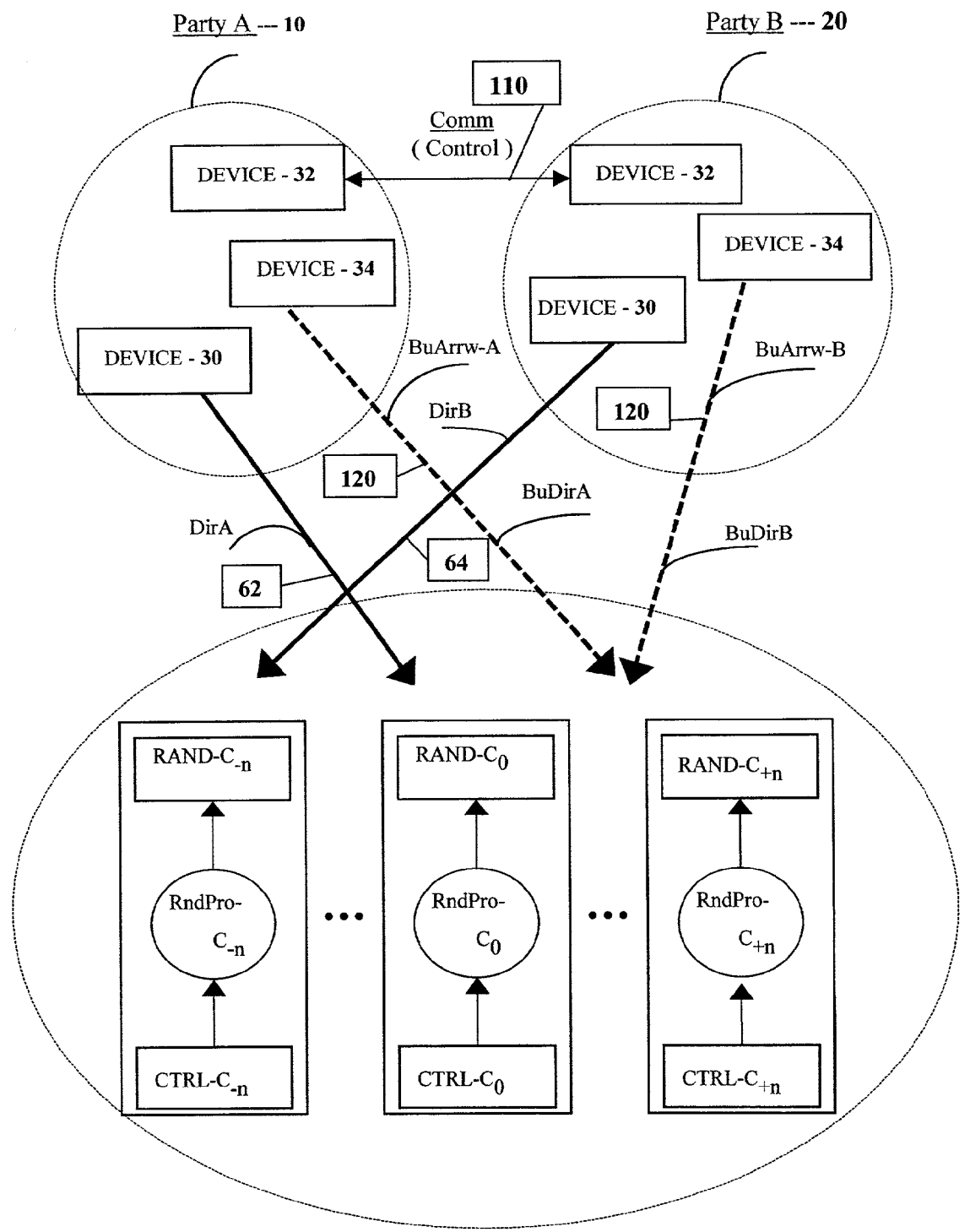
FIG. 8 is a simplified schematic diagram illustrating in greater detail a back up process designed to provide resynchronization between parties that have lost synchronization as indicated by FIG. 6.

Reference is now made to FIG. 8, which is a simplified schematic diagram showing a modification of the embodiment of FIG. 7. Parts that are identical to those shown above are given the same reference numerals and are not referred to again except as necessary for an understanding of the present embodiment. In FIG. 8 the backup synchronizer 32 manages resynchronization, and additionally manages communication between the two parties regarding the resynchronization. However, as will be appreciated, it does not communicate the backup hop address, nor the backup data. A back-up hop address generator 34 generates a backup hop address from the stored backup data, that is to say a previously received random data is set aside (in backup synchronizer 32) for use as input data to the backup selection process generator 34 to generate the backup hop address. As will be explained below, the data to be used for generating the backup hop address is preferably only used following a given delay after it has been copied and used for generating regular selection(s) of the regular hop address(es). The data has thus been able to verify its correctness at both parties before it is used as backup data.

The backup hop address generator 34 preferably generates a backup hop address using the random data that has been stored for this purpose in backup synchronizer 32. The process is carried out identically at each of the parties 10 and 20 so that they are directed to the same random process, as indicated by broken arrows 120, as the backup hop address.

As illustrated in FIG. 8, the two parties cease to be mutually synchronized, (as indicated by different addresses pointing arrows 62,64) and each party finds itself using a different regular hop address. As explained above, the situation is recognized. The two parties attempt to resynchronize as described above and since the back up hop address has been generated and selected based on random information verifiably obtained prior to synchronization loss, each party can be confident that the correct backup hop address will be used by the other party. Furthermore, control messages after the backup hop address has been carried out may confirm that backup activation has worked successfully.

Thus, as explained above, the parties are preferably able to recognize that synchronization has been lost and get back into synchronization by using a back up hop address (indicated by broken arrows 120).

The skilled person will be aware that it is also possible to prearrange a fixed, that is to say constant, backup hop address. However, such an arrangement necessarily weakens the confidentiality of the system.

As mentioned above, loss of synchronization occurs with a certain level of probability of occurrence—depending on the lines, systems etc. and particularly on the error correction code in use—so that in general it can be assumed that such a case occurs every once in a while, the parties successfully remaining synchronized most of the time. The back up data for generating the backup hop address changes randomly, but at a lower frequency than the frequency of the data for generating regular hop addresses and this lower frequency may be selected based on the channel conditions and associated factors.

The back up hop address preferably allows resynchronization in such a way that the two parties can rely on the random data used for generating it. Thus, problems due to the "Byzantine Agreement Problem" mentioned above are preferably overcome. A preferred mechanism for allowing the parties to simultaneously manage an identical backup hop address in such a way as to satisfy these requirements is to use a control procedure in which a series of regular hops are grouped into sessions and rounds as follows:

1) A session is a complete (that is, it has a beginning and an end) stage of a consecutive series of stages of hop addresses, built of blocks of individual periods spent at a given hop address. Such a period may comprise obtaining an output stream from the random process at the currently selected hop address and use of the output random stream, for any purpose (that is for any process requiring random numbers) and as input data for a regular selection process, or in other words of generating the next regular hop address. A session may be any number of such blocks, including one.

2) A regular session, being a session that begins with a regular hop address.

3) A backup session being a session that begins with a backup hop address (that is, the beginning was by a backup hop address, that is, the first block of the session and of course the hop addresses of the following blocks are regular hop addresses which are, along the session, being consecutively automatically generated and used).

4) A successful session being a session at the end of which the parties are still in synchronization (to a party's best knowledge) that is, to a party's best knowledge the parties have the same regular hop address for beginning a next session, when needed.

5) A successful regular session is a regular session as defined above and is also a successful session as defined above.

6) A round is a period during which the random backup data for generating backup hop address is maintained between changes. The random backup data for generating a backup hop address is changed randomly simultaneously at each of the parties, once per round, which round comprises a predetermined number of successful regular sessions (say N sessions).

7) At the end of a round the random backup data for generating a backup hop address is changed randomly in the background, by the random data gathered at the first K blocks of that round (that is, the random backup data for generating backup hop address is the random data gathered at the first K blocks of a round). Those first K blocks are from the first sessions of the round, and may all be from the same session— (the first session in the round, if this first session comprises K or more blocks (K is to be defined in a working system, and is parametric, but, K is at least 1, and is much less than N). In such a case, the new random backup data ready for generating the new backup hop address at the end of a round is based on random data taken from the beginning of that round, which party has intrinsically confirmed that he has correctly received those K pieces of random data, in that he has successfully reached the end of the round and no use of a backup session occurred.

8) As soon as any party recognizes that they are out of synchronization in regards to the regular hop address, the following procedure is entered and it is described from the point of view of one of the parties:

1) the party recognizing synchronization loss informs the other party of loss of synchronization, 2) the next coming session is defind as a backup session, that is, the party uses the stored backup random data to generate a backup hop address to begin the session to come, 3) any activation of a backup session stops counting of the current round, 4) a successful regular session following a backup session starts a new round, and the count begins from 1 (up to N).

Preferably, the backup random data to generate a backup hop address remains the same until it is exchanged in the normal way at the end of the current round. Thus, in the unlikely event that there is a further loss of synchronization before the following new round end is reached, the same backup hop address will be used twice or more. Should possible double or more use of the same backup hop address be regarded as a security risk, then the skilled person will be able to design an embodiment in which the generation of the back-up hop address is dependent not only on the backup random data but also on one more parameter (some stream of bits) that changes between one backup activation and another, and which is messaged between the parties. (it can be sent in the open and be received by any third unauthorized party, but this third party does not have the confidential backup random data in his hands to generate the same backup hop address. Effectively such an embodiment provides several different generators which work differently on the same data. Thus, again, only verified data is used, but different results are produced.

Figure 9:
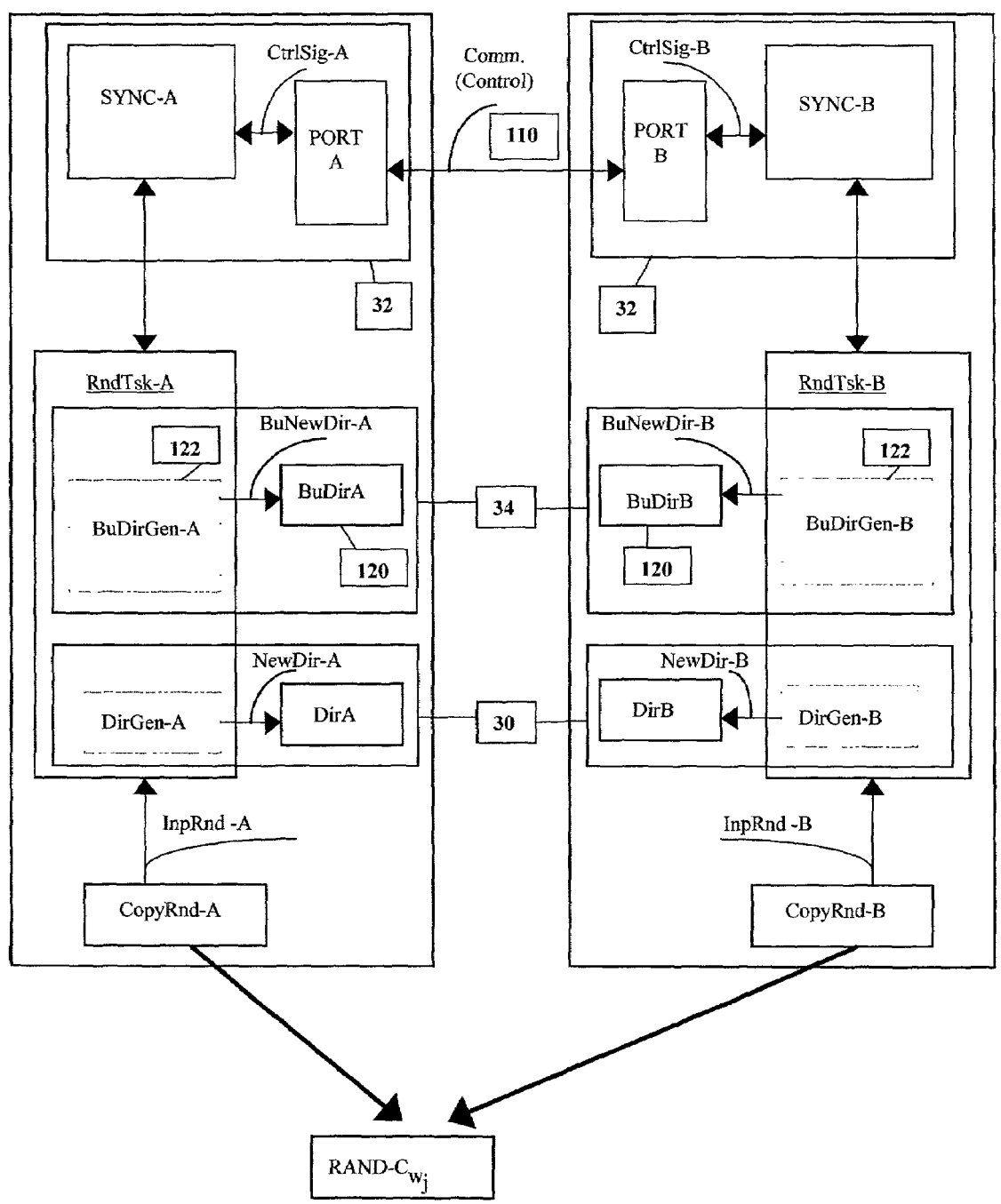
FIG. 9 is a simplified block diagram of a device for carrying out the back-up process of FIG. 8.

Reference is now made to FIG. 9, which is a generalized block diagram showing the back up synchronizers 32 and the backup hop address generator 34 in greater detail. Parts that are identical to those shown above are given the same reference numerals and are not referred to again except as necessary for an understanding of the present embodiment. As previously discussed, the back up synchronizer 32 manages direct communications between the two parties regarding synchronization. The backup hop address generator 34 comprises an address former 122 which produces a new hop address (which is placed in register box 120) based on the stored data previously used to form a regular hop address. In one embodiment the address former 122 comprises its own generator to which the stored random data serves as an input. Clearly, the regular and backup hop addresses are best generated by different generators having different settings (a regular address former 30 being available).

Figure 10:
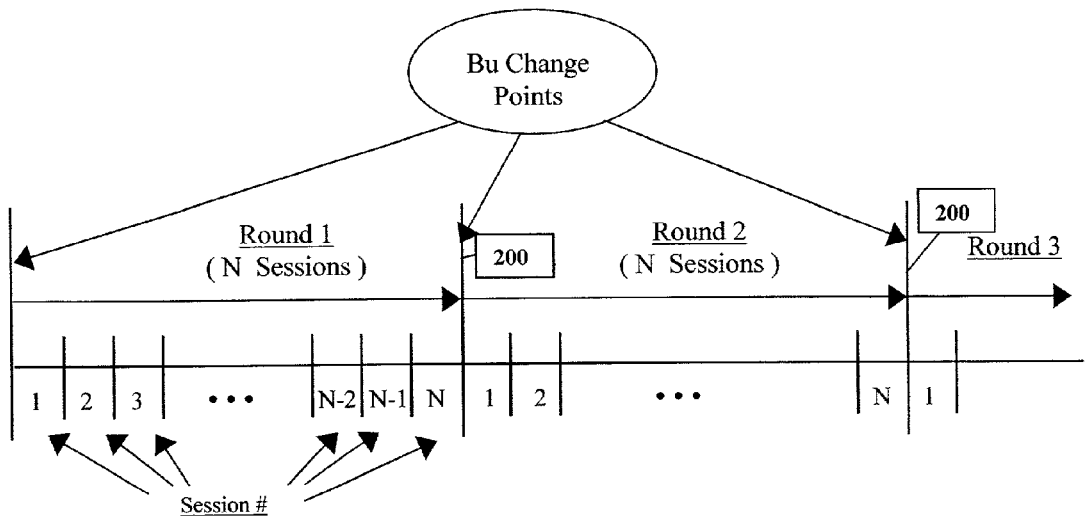
FIG. 10 illustrates schematically a series of rounds in a random data sharing process according to embodiments of the present invention.

Reference is now made to FIG. 10, which is a simplified diagram showing three successive rounds 1 to 3. Each round comprises N sessions, and at the end of each of the rounds (marked 200 in the figure) the backup random data (which is used to generate the backup hop address when needed) is changed in memory, and is gathered during the first or first few sessions and comprises the regular random data of the first K blocks of the currently completed round As discussed in detail above, the backup hop address is generated by random data that has been used earlier for generating regular hop addresses. Since regular processing was successfully carried out by the two parties up to that stage without loss of synchronization, each one may be sure that the other has the same backup random data.

However, a potential problem arises if synchronization is lost close to the changeover point. It is possible that one of the parties may have realized that synchronization was lost just before the changeover and used the existing backup, the other one realizing only after the changeover and thus exchanging the backup data. Alternatively, the loss of synchronization may itself be the result of a miscalculation in obtaining a synchronized changeover point (that is, they differ in their counting of sessions).

Figure 11:
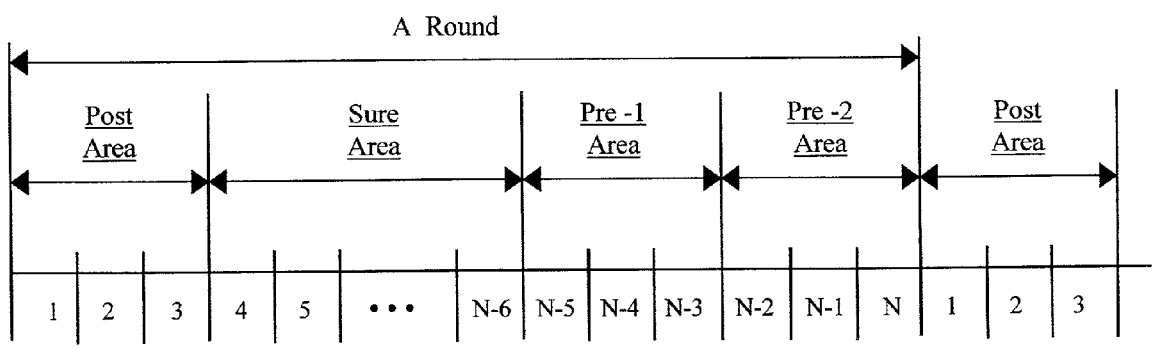
FIG. 11 is a more detailed schematic illustration showing the structure of one of the rounds of FIG. 10.

Reference is now made to FIG. 11 which is a simplified diagram showing the internal structure of a single round of N sessions and which demonstrates a way of overcoming the above-mentioned problem. The round is preferably divided into four areas, labeled a post area, a sure area, a pre-1 area and a pre-2 area. Following the pre-2 area is the post area of the next round. Each such area comprises a plurality of sessions, but the areas need not be of equal size, as will be explained below.

Any interaction between the parties preferably utilizes the four areas by applying a rule which says that the parties to a communication may be separated from each other by one area only. As discussed above, if synchronization is lost, the party that has lost synchronization, and recognizes the synchronization loss, does not continue to count ahead. Thus, the worst possible case scenario is that one party recognizes the loss of synchronization and stops counting but the other party has not yet recognized the loss despite the control communications between the parties and thus may move ahead one or more sessions. If the loss of synchronization happens at the end of an area, then the party moving ahead may find itself one area ahead due to continuing until its belated recognition of the loss of synchronization too.

If the areas themselves comprise more than 2 sessions, it is possible to ensure that the parties are not separated by more then one area. This is achieved by controlling the system so that a maximum separation of one session is the maximum possible, such that no party is able to move ahead without receiving a control message from the other party, comprising detection code bits, (as explained above). If the control bits are not received, or the received bits indicate that something is wrong, then the counting ahead stops. Thus, in the worst possible case the parties separate by very few sessions (less than the number of the smallest area) before both the parties are able to freeze their counts.

Grey areas are thus defined around each of the changeover points 200, to indicate the areas in which one party may have made the changeover without the other. Any party finding itself in the grey area following synchronization loss is preferably required to bear in mind that the other party may be using a different backup hop address.

In contrast with the grey area there is a Sure Area. The sure area is that part of the round that is relatively far from the surrounding change points, such that in case of resynchronization, a party in this area can rely on the fact that the other party is using the same backup hop address. Thus the party is able to use the 'in hard memory' back up random data to generate the backup hop address.

The post area is the leading area of a new round, immediately after the last changeover.

The Pre-2 Area is the area just before the changeover and the post area of the new Round.

The Pre -1 Area is located between the Sure Area and the Pre-2 Area

Upon reaching the changeover point (at the end of session N of a round) the new ('the next') backup random data replaces the current backup random data in hard memory. Thus, whilst entering into the post area, the parties already have in hard memory the new backup random data.

In the pre-1 and pre-2 areas the parties preferably retain in memory the old i.e. current, backup random data. However, the parties may, if needed, obtain new backup random data to generate the next backup hop address from data obtained at the beginning of the current round and held in readiness. Nevertheless, at this stage, the parties preferably neither erase the current backup data, nor actually replace it with the next.

Control messages are preferably used at the start of each session to initialize the session. One of the parties, preferably the party that initiates a session, uses such control messages and is designated as the session master. The other party is thus designated as the slave of that session. Thus, in each session the roll of a party can change from master to slave.

The parties preferably exchange control messages (the above mentioned recognition codes), either periodically during the session or at the beginning and the end of the session, or at least at the beginning of a session, and each receiver of such a control message examines it, and decides whether or not they are in synchronization. If it determines that they are out of synchronization then the party receiving the control message and recognizing that synchronization has been lost informs the other party and a backup session is initiated. If they are in synchronization then a regular session is initiated and the session proceeds based on the regular hop addresses.

If the parties are not in synchronization, the master designates the present session as a back-up session and a backup hop address is generated from the backup data and is used in place of whatever regular addresses may be held by the parties. In this case the master sends to the slaves a control message indicating a backup session. Furthermore, , the master preferably adds a command as to which backup hop address is going to be used—the current one ('Curr') or the next one ('Nxt').

The Slave sends back a control message, which may or may not agree to the mode (regular or back up) requested by the master. The slave preferably always agrees to a backup session. However, if the slave is out of synchronization, to the best of its knowledge, then it indicates this by disagreeing with a request for a regular session. Thus any one of the parties is in fact free to force a backup session.

Reference is now made to FIG. 12, which shows, in tabular form, the procedure at the master and at the slave, for managing a backup session:

Any party, master or slave, if in areas Sure, Pre-1 and Pre-2 thus preferably has in its 'hard memory' the current backup data to generate therefrom the current backup hop address automatically, and thus it can be regarded as having in its hard memory the current backup hop address.

Any party, master or slave, if in area Post, preferably has in its hard memory the backup data to follow the changeover (the next round current backup data) to generate therefrom the next backup hop address automatically, thus it can be regarded as having the next backup hop address in its hard memory.

Any party, master or slave, if in areas Pre-1 and Pre-2 has in addition to the current backup data stored in its hard memory, also has the next backup random data, not yet hard, but ready and able to generate the next backup hop address. The use of a next backup hop address will be referred to hereinbelow as 'ad hoc', in contrast to 'hard'.

The master acts as follows: If the master is in the Sure area it preferably utilizes the current backup hop address (Current). In addition, it sends a control message to the slave indicating that it too is to use the current backup (Curr.).

If the master is in the pre-1 area, it proceeds as in Sure area: uses the current backup hop address (Current), and indicates this state of affairs by signaling "current" or "Curr" to the slave.

If the master is in the pre-2 area it uses the next backup hop address—Next1—(ad hoc), and signals to the slave: Nxt The master preferably does not erase the current backup hop address at this point, when it uses the next ad hoc.

If the master is in the post area, it preferably uses the next backup hop address—Next—this time having placed in the hard memory since the backup changeover point was passed. The master signals to the slave: Nxt The slave party proceeds as follows:

If the slave is in the sure area it ignores the control message it receives from the master (indicated as N.M.) and uses the current back-up hop address (the in 'hard memory') (Current).

If the Slave is in the pre-1 area it checks the control message received from the master.

If the control message says 'Curr' it uses the current backup hop address (the in 'hard memory')(Current), and if it says 'Nxt' it uses the Next backup hop address (Next1) (–ad hoc).

If the Slave is in the pre-2 area it acts exactly in the same way as in the pre-1 area.

If the Slave is in the post area it ignores the control message received from the master ('N.M'="ignored" in the table) and uses the next backup process from the hard memory (Next)—which, of course, for that next round is the current one.

As mentioned above, a new round is preferably counted only from the next regular session after a backup session restores synchronization. Regular sessions are counted, from 1 to N again, only from this next session. New backup random data is obtained, as before, from the first blocks or sessions of the new round, and are stored for use if needed for generating a new backup hop address at the end of that round at the changeover or just before the changeover, or later on in a future round, so that secure resynchronisation can be achieved.

The above-described embodiments thus provide a system and method for sharing random processes in a confidential manner over a non-confidential infrastructure or network. The random processes may for example be used in two-way communication. A way of selecting between the multiplicity of random processes is available to all legitimate parties to a communication. At the same time the way of selecting is not available to outsiders. Synchronization loss is dealt with by having a backup random process that the parties are able to fall back on as necessary. The backup random process is preferably obtained and used in a procedure which overcomes the logical dilemma of the Byzantine agreement problem, as described above,. The shared random outputs can thus be shared freely in an open infrastructure or network without compromising confidentiality. The system and method may be used in any application requiring random data to be independently and simultaneously available at two remote parties.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. A system for rendering available identical random outputs to different users at multiple locations connected via electronically networked devices over an open computer network, the system comprising: random processes producing said random outputs, said random processes being arranged to provide a field of said random outputs, said field being available in an open network to at least two separate parties, said parties being among said users at multiple locations, each of said parties finding said field via said open network; and a plurality of said electronically networked devices, each comprising a processor, respectively available to each of said parties, the devices for confidentially selecting for use by respective processors at each of said parties, at a same time, a same one of said field of random processes from said open network, thereby from said field via said open network to confidentially provide said random outputs simultaneously to said parties at multiple locations.

2. The system of claim 1, wherein said first device is operable to consecutively change a selection of one of said plurality of random processes in a random manner at each of said parties.

3. The system of claim 1, wherein said first device is operable to select pseudorandomly from said plurality of random processes.

4. The system of claim 1, wherein said first device is operable to select randomly from said plurality of random processes.

5. The system of claim 1, wherein said parties are remotely located and connected via said open network.

6. The system of claim 1, wherein said first device is a software device.

7. The system of claim 1, wherein said parties are connected via a network and wherein said system is located on a host connected to said network.

8. The system of claim 1, wherein said first device is placeable by said system with each party and which comprises a function operable to use an output of said selected random process to provide a new selection of a random process.

9. The system of claim 1, further comprising a second device for placing with each party, said second device being operable to continuously communicate control messages between said parties, said control messages providing an indication of mutual synchronization of a current selection process of said parties.

10. The system of claim 9, wherein said control messages contain data sufficient to enable each party to decide whether it is in synchronization with a party originating said control messages.

11. The system of claim 10, said data further comprising error detection code bits generatable from the output random data of the selected random process.

12. The system of claim 10, said data comprising a subset of bits selectable from said selected random process output, said selection being sparse.

13. The system of claim 9, further comprising a third device placeable with each party for keeping in memory at least some of the output of at least one previously selected random process.

14. The system of claim 13, wherein said third device is operable to select output from at least one of a plurality of random processes for backup data to be kept in memory.

15. The system of claim 13, wherein said third device is operable to consecutively change said selected random process from which the output is kept in memory, in a random manner.

16. The system of claim 13, wherein said third device is operable to select pseudorandomly from said plurality of random processes.

17. The system of claim 13, wherein said third device is operable to select randomly from said plurality of random processes.

18. The system of claim 13, wherein said third device is operable, following detection of loss of synchronization between the parties, to provide selected data to input to a function to select one of said plurality of random processes.

19. The system of claim 13, wherein memorized data from a previously selected random process serves to select a backup random process to be used in a next step by said parties, following synchronization loss.

20. The system of claim 19, wherein said memorized data is selectable from a previously selected random process that has successfully maintained synchronization between the parties.

21. A system for rendering available identical random outputs to different users at multiple locations connected electronically over an open computer network, the system comprising:

a plurality of regularly changing random processes producing a field of random outputs of said regularly changing random processes over said open computer network for electronic access by at least two separate parties among said different users, said parties being among said different users at multiple locations, said at least two parties accessing said field over said open network; and a plurality of electronic network-enabled devices, each comprising a processor, said devices available to respective ones of said parties for remote connection to said processes via said open network and configured for confidentially selecting for use by respective processors at each of said parties, at a same time, a same one of said plurality of regularly changing random outputs from said field over said open network, thereby to confidentially provide said random outputs simultaneously to said parties.

* * * * *

UNITED STATES PATENT AND TRADEMARK OFFICE
CERTIFICATE OF CORRECTION

PATENT NO. : 7,739,409 B2  Page 1 of 1
APPLICATION NO. : 09/791686
DATED : June 15, 2010
INVENTOR(S) : Eli Yanovsky It is certified that error appears in the above-identified patent and that said Letters Patent is hereby corrected as shown below:

Title page,

Item [54] Title, line 3, change "SEPERATE" to --SEPARATE--

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,739,409 B2  Page 1 of 1
APPLICATION NO. : 09/791686
DATED : June 15, 2010
INVENTOR(S) : Eli Yanovsky It is certified that error appears in the above-identified patent and that said Letters Patent is hereby corrected as shown below:

Title page, Item (54) line 3 and at Column 1, line 3

Title, change "SEPERATE" to --SEPARATE--

This certificate supersedes the Certificate of Correction issued October 12, 2010.

Signed and Sealed this

Ninth Day of November, 2010

David J. Kappos
*Director of the United States Patent and Trademark Office*